June 6, 1944.  H. E. DICKERMAN  2,350,881
TOOL
Filed April 12, 1943
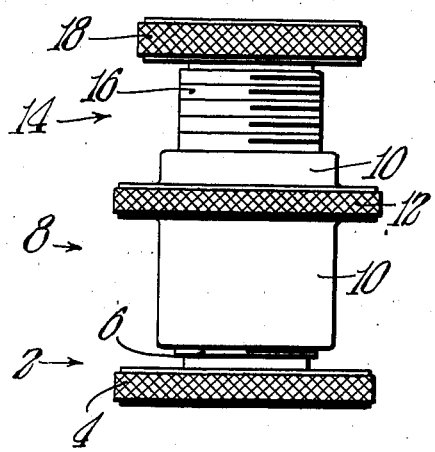
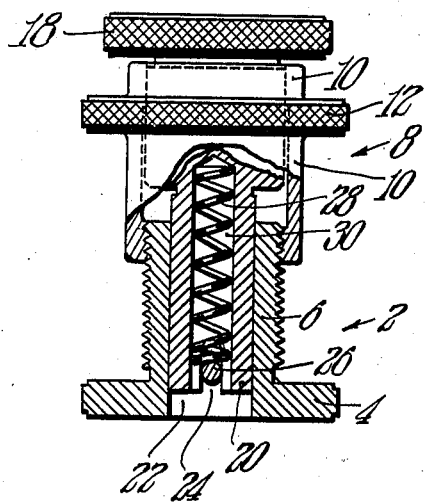
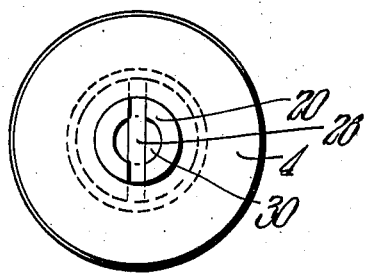
INVENTOR.
Hubert E. Dickerman.
BY
Walter C. Ross, Attorney.

Patented June 6, 1944

2,350,881

UNITED STATES PATENT OFFICE 2,350,881

TOOL

Hubert E. Dickerman, Springfield, Mass.

Application April 12, 1943, Serial No. 482,707

1 Claim. (Cl. 33—163)

This invention relates to improvements in tools and is directed more particularly to improvements in measuring or gauging tools.

The principal objects of the invention are directed to a tool for measuring, comparing and other uses which may be called a zero setter that is characterized by its novel construction and arrangement of parts, accuracy and ease of manipulation.

With the foregoing and various other novel features and advantages and other objects of my invention as will become more apparent as the description proceeds, the invention consists in certain novel features of construction and in the combination and arrangement of parts as will be hereinafter more particularly pointed out in the claim hereunto annexed and more fully described and referred to in connection with the accompanying drawing wherein:

Figs. 1 and 2 are side elevational views of the tool of the invention with the elements thereof in different relative positions; and Fig. 3 is an inverted plan view of the tool shown in Figs. 1 and 2.

Referring now to the drawing more in detail, the invention will be fully described.

A lower base 2 is provided which has a flange 4 for supporting the tool, and a body portion 6 that is threaded externally.

An intermediate nut 8 has upper and lower skirt portions 10 and an intermediate manually engageable ring part 12. The lower skirt part is internally threaded to coact with the threaded part 6 of the base.

An upper member 14 has a threaded portion 16 in screw threaded engagement with the upper skirt 10 of the nut and a manually engageable part 18. A pilot 20 of the member is reciprocably guided in a bore 22 of the base 2 and its lower end is slotted at 24 and receives a pin 26 that extends across the bore 22 and is fixed in the base. The pin and slot prevent relative rotation of the member 14 and base 2 and permits relative reciprocation thereof.

A spring 28 in a bore 30 of the pilot 20 is arranged to exert pressure between the bottom of bore 30 and pin 26 tending to urge the base 2 and member 14 apart.

The parts 4, 12 and 18 are knurled to facilitate engagement by the fingers for turning the nut relative to the base and upper member which brings about relative reciprocating movements of the said base and upper member.

The end faces of the members 2 and 14 are ground and lapped as is the pilot and its bore to the end that accuracy is attained.

The threads of the part 6 are of relatively coarser pitch than those of part 16, or they may be vice versa, whereby as the nut is rotated in one direction or the other relative to the base member and upper member the said members 2 and 14 are moved towards or away from one another, as may be desired.

The tool has many and various uses and is particularly adapted for use by die, jig and gauge makers, inspectors and the like and is useful in connection with size blocks and zero indicators for measuring and comparison purposes. The tool is adapted to support a pile or piles of size blocks and is quickly adjustable so that the blocks may be brought to a zero reading of an indicator for subsequent calculations. The tool is so constructed and arranged that it may be used wherever accuracy is required and being readily adjustable it is useful in numerous and various measuring, calculating and comparison operations in the tool room, shop inspector's bench, and the like.

The invention may be embodied in other specific forms without departing from the essential characteristics thereof. Hence, the present embodiments are therefore to be considered in all respects merely as being illustrative and not as being restrictive, the scope of the invention being indicated by the appended claim rather than by the foregoing description, and all modifications and variations as fall within the meaning and purview and range of equivalency of the appended claim are therefore intended to be embraced therein.

What it is desired to claim and secure by Letters Patent of the United States is:

A zero setter comprising in combination, a lower member having an integral base and externally threaded shank portion extending upwardly therefrom and integral therewith, said base and upwardly extending part provided with an axial bore, an upper member having a lower pilot reciprocable in said bore of the shank and base with a relatively larger intermediate externally threaded portion thereabove and a manually engageable part at the upper end of said upper member, said upper member having an axial bore extending upwardly into the pilot having a bottom and a groove at the lower end of the pilot disposed transversely of said bore, an intermediate nut member having an external manually engageable part extending outwardly therefrom and separate internally threaded portions engaging the threaded portions of the upper and lower members, a pin extending transversely of the bore of the lower member disposed in the groove thereof to prevent relative turning of the upper and lower members, and a spring in the bore of the pilot between the bottom thereof and said pin resisting movements of the upper member downwardly relative to the bottom member and urging said members apart, the threaded portions of the upper and lower members being of different pitch whereby rotation of said nut member brings about axial movements of said members.

HUBERT E. DICKERMAN.